(12) United States Patent
Schneider et al.

(10) Patent No.: US 7,261,314 B2
(45) Date of Patent: Aug. 28, 2007

(54) AIRBAG COVER ATTACHMENT AND OPENING ASSEMBLY

(75) Inventors: David W. Schneider, Waterford, MI (US); Henry V. Phillips, Shelby Township, MI (US); Timothy A. DePottey, Flint, MI (US)

(73) Assignee: Autoliv ASP, Inc., Ogden, UT (US)

( * ) Notice: Subject to any disclaimer, the term of this patent is extended or adjusted under 35 U.S.C. 154(b) by 269 days.

(21) Appl. No.: 10/958,065

(22) Filed: Oct. 4, 2004

(65) Prior Publication Data

US 2006/0071457 A1 Apr. 6, 2006

(51) Int. Cl.
*B60R 21/16* (2006.01)
*B60R 21/20* (2006.01)

(52) U.S. Cl. .................... 280/728.3; 280/731; 280/732

(58) Field of Classification Search ............ 280/728.2, 280/728.3, 731, 732; 220/783, 788, 797
See application file for complete search history.

(56) References Cited

U.S. PATENT DOCUMENTS

| | | | | |
|---|---|---|---|---|
| 3,108,710 A | * | 10/1963 | Lange et al. ................ 220/613 |
| 4,124,141 A | * | 11/1978 | Armentrout et al. ........ 220/783 |
| 4,397,404 A | * | 8/1983 | Blanchette ................... 220/783 |
| 4,458,825 A | * | 7/1984 | Holota ........................ 220/782 |
| 4,895,389 A | | 1/1990 | Pack, Jr. |
| 5,085,462 A | * | 2/1992 | Gualtier ...................... 280/731 |
| 5,308,106 A | * | 5/1994 | Heidorn .................... 280/728.3 |
| 5,348,549 A | * | 9/1994 | Brown et al. ............... 604/403 |
| 5,470,097 A | * | 11/1995 | Elqadah et al. ........... 280/728.3 |
| 6,623,029 B2 | * | 9/2003 | Sun et al. ................. 280/728.2 |
| 6,802,526 B2 | * | 10/2004 | Dumbrique et al. ..... 280/728.2 |
| 7,140,636 B2 | * | 11/2006 | DePue et al. ............... 280/732 |
| 2002/0074782 A1 | * | 6/2002 | Saito .......................... 280/732 |
| 2003/0106894 A1 | * | 6/2003 | Budowski et al. ......... 220/4.28 |

\* cited by examiner

*Primary Examiner*—Paul N. Dickson
*Assistant Examiner*—Joseph Rocca
(74) *Attorney, Agent, or Firm*—Sally J Brown; Stoel Rives, LLP

(57) ABSTRACT

An airbag assembly is disclosed for use in automotive protective systems. In one embodiment, the airbag assembly includes a cover with one or more ribs. A tray defines a cavity for housing an airbag and includes one or more channels that each receive a corresponding rib. An end of the cover is secured to an end of the tray. Upon deployment of an airbag, the cover pulls from the tray and dislodges the ribs from the channels.

27 Claims, 5 Drawing Sheets

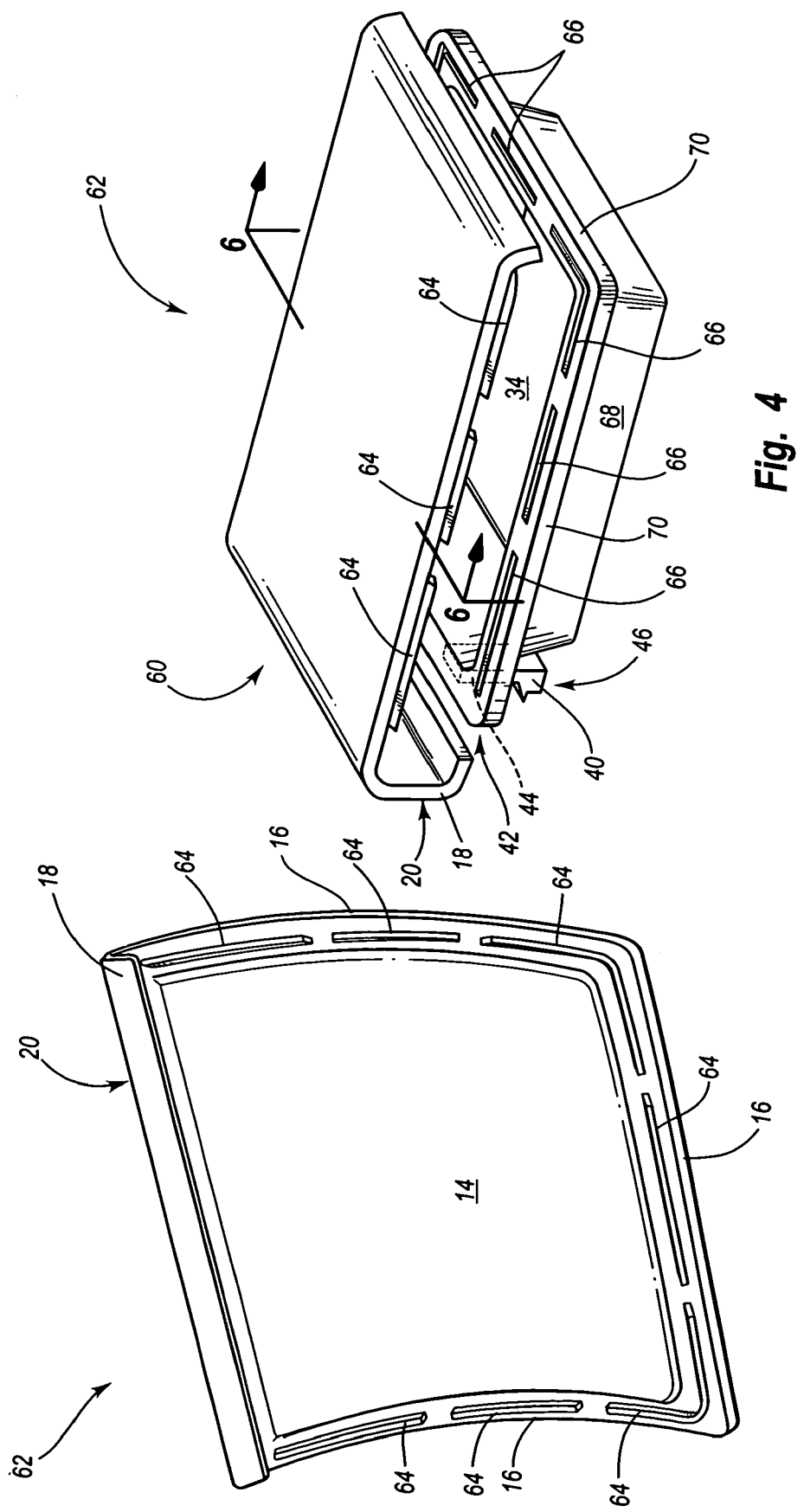

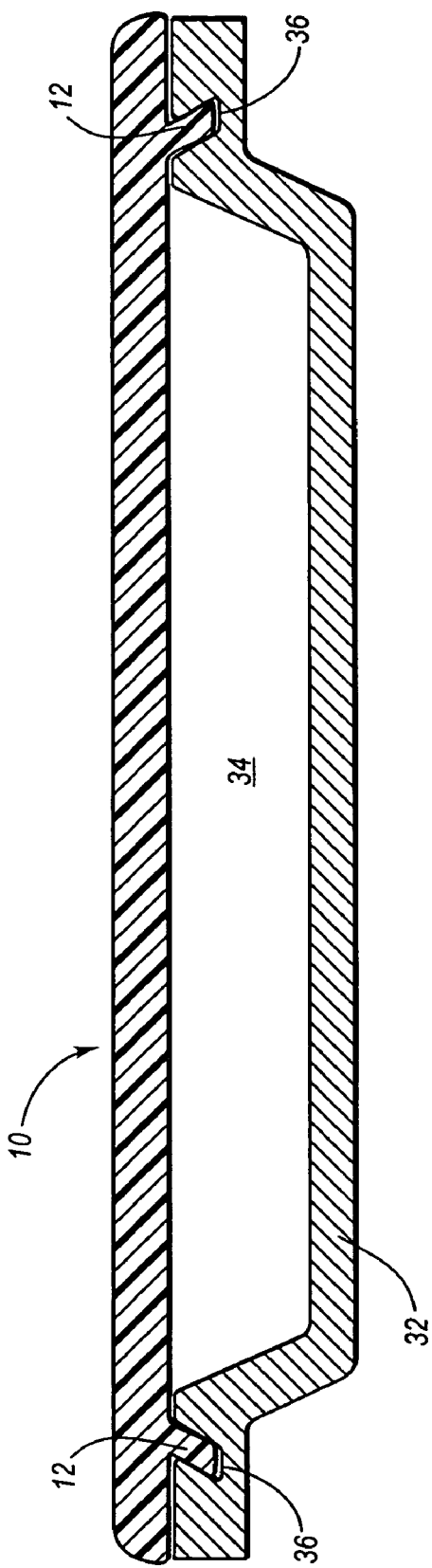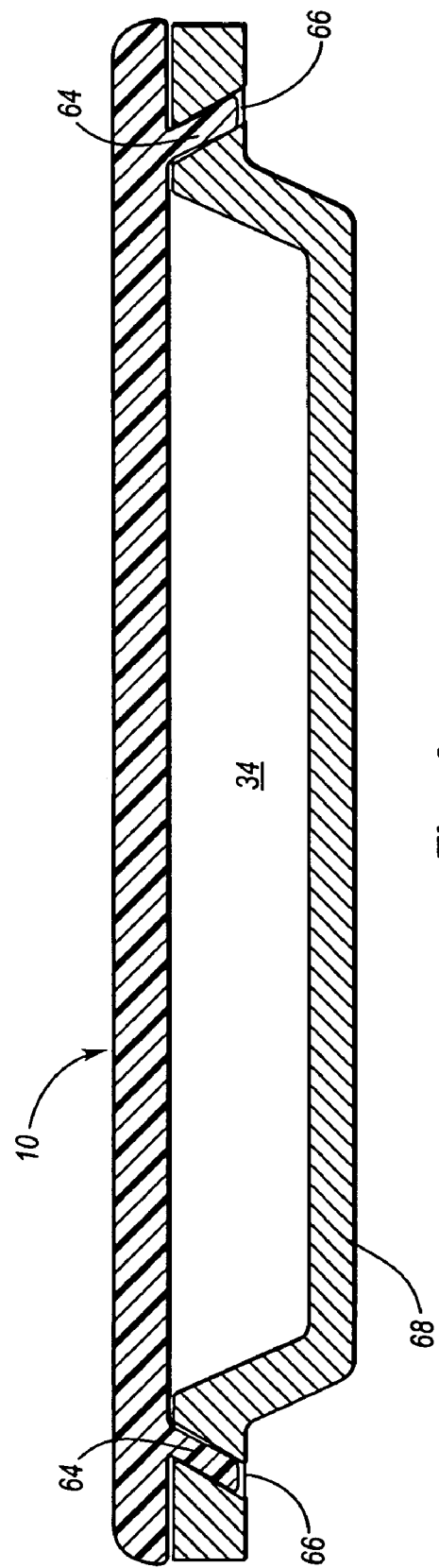

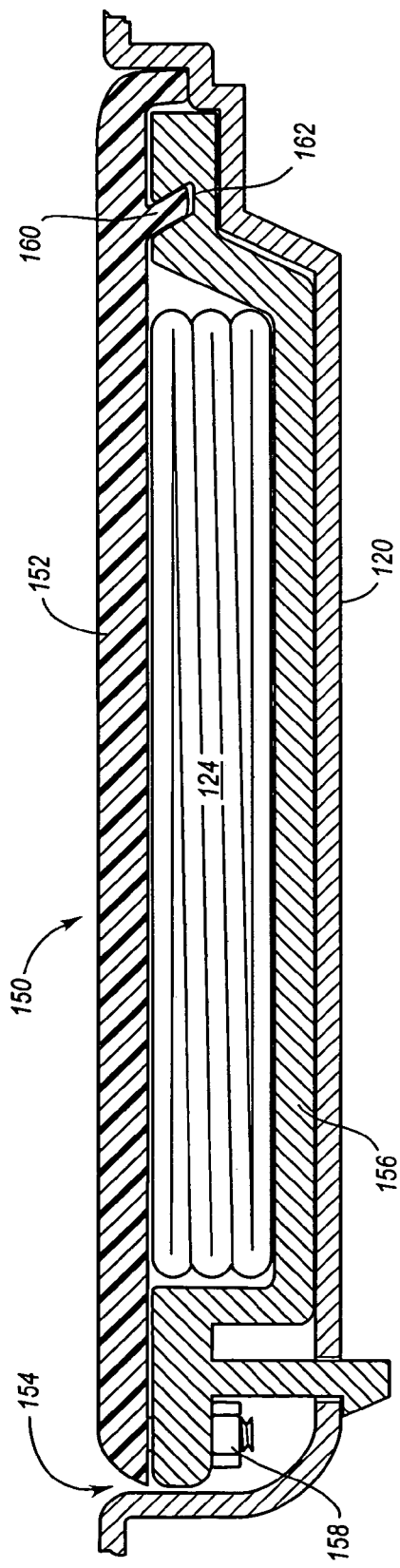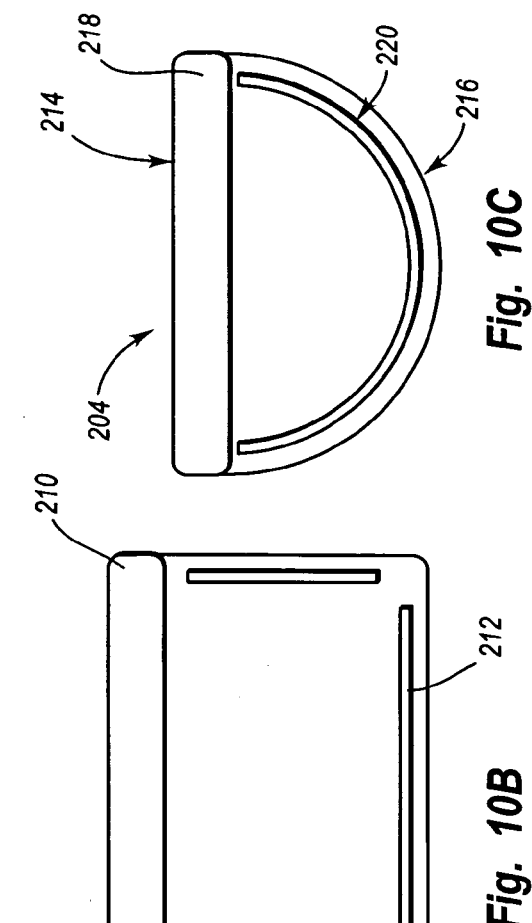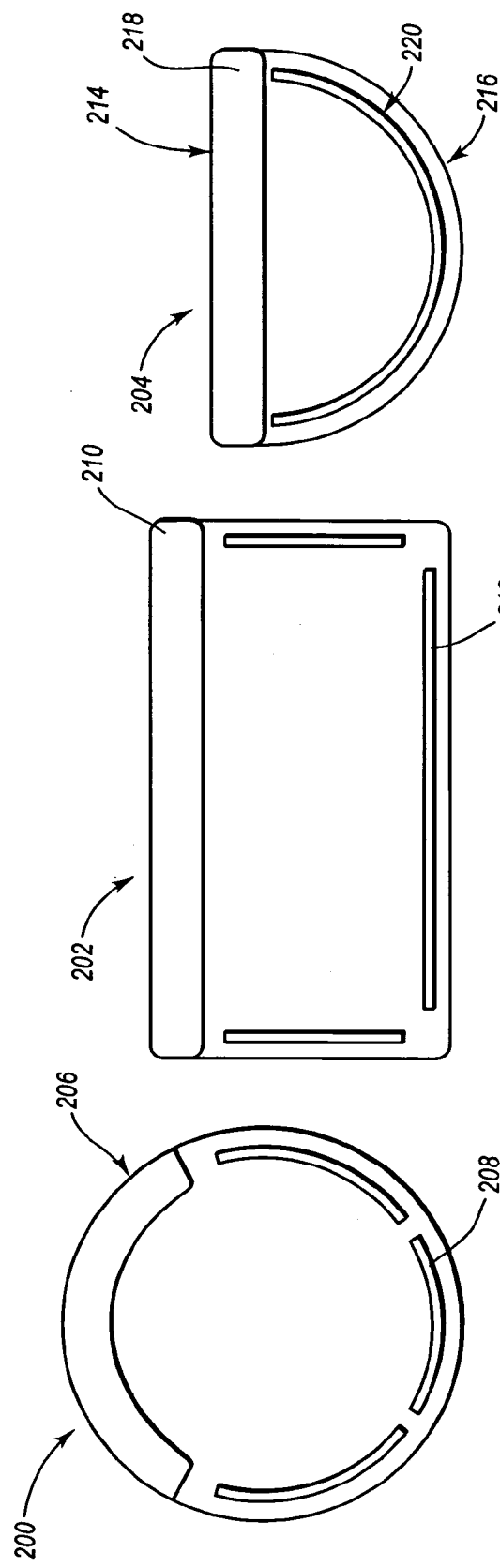

AIRBAG COVER ATTACHMENT AND OPENING ASSEMBLY

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 3 is a perspective view of an alternative airbag cover.

FIG. 4 is a perspective view of an alternative airbag opening assembly including the airbag cover of FIG. 3.

FIG. 5 is a cross-sectional view of the airbag cover and tray of FIG. 2.

FIG. 6 is a cross-sectional view of the airbag cover and tray of FIG. 4.

FIG. 9 is a cross-sectional view of an alternative embodiment of an airbag cover and tray.

FIG. 10A is a plan view of an alternative embodiment of an airbag cover.

FIG. 10B is a plan view of an alternative embodiment of an airbag cover.

FIG. 10C is a plan view of an alternative embodiment of an airbag cover.

DETAILED DESCRIPTION OF PREFERRED EMBODIMENTS

Described below are embodiments of an airbag cover attachment and opening assembly. As those of skill in the art will appreciate, the principles of the invention may be applied to and used with a variety of airbag deployment systems including frontal driver and passenger airbags, knee airbags, overhead airbags, curtain airbags, and the like. Embodiments of the cover attachment and opening assembly allow for a single attachment for a cover and tray that together enclose and support an airbag. A cover does not require a tear seam as it is not ruptured upon airbag deployment.

In embodiments of the attachment and opening assembly, a cover includes ribs disposed on its inner panel. The ribs parallel the perimeter of the cover and extend along the majority of the perimeter. A tray includes channels to receive the ribs. The cover may further include a curved member to wrap around a portion of the tray and to secure the curved member between the tray and a support surface. Alternatively, a portion of the cover may be secured to the tray by bolts, clips, adhesives or other fastening devices. In assembling the cover to the housing, the ribs are introduced into the tray channels. Upon airbag deployment, the cover bulges which causes disengagement of the ribs from the channels. The majority of the cover is thereby separated from the tray which allows an airbag to deploy into position.

Figures 1, 2:
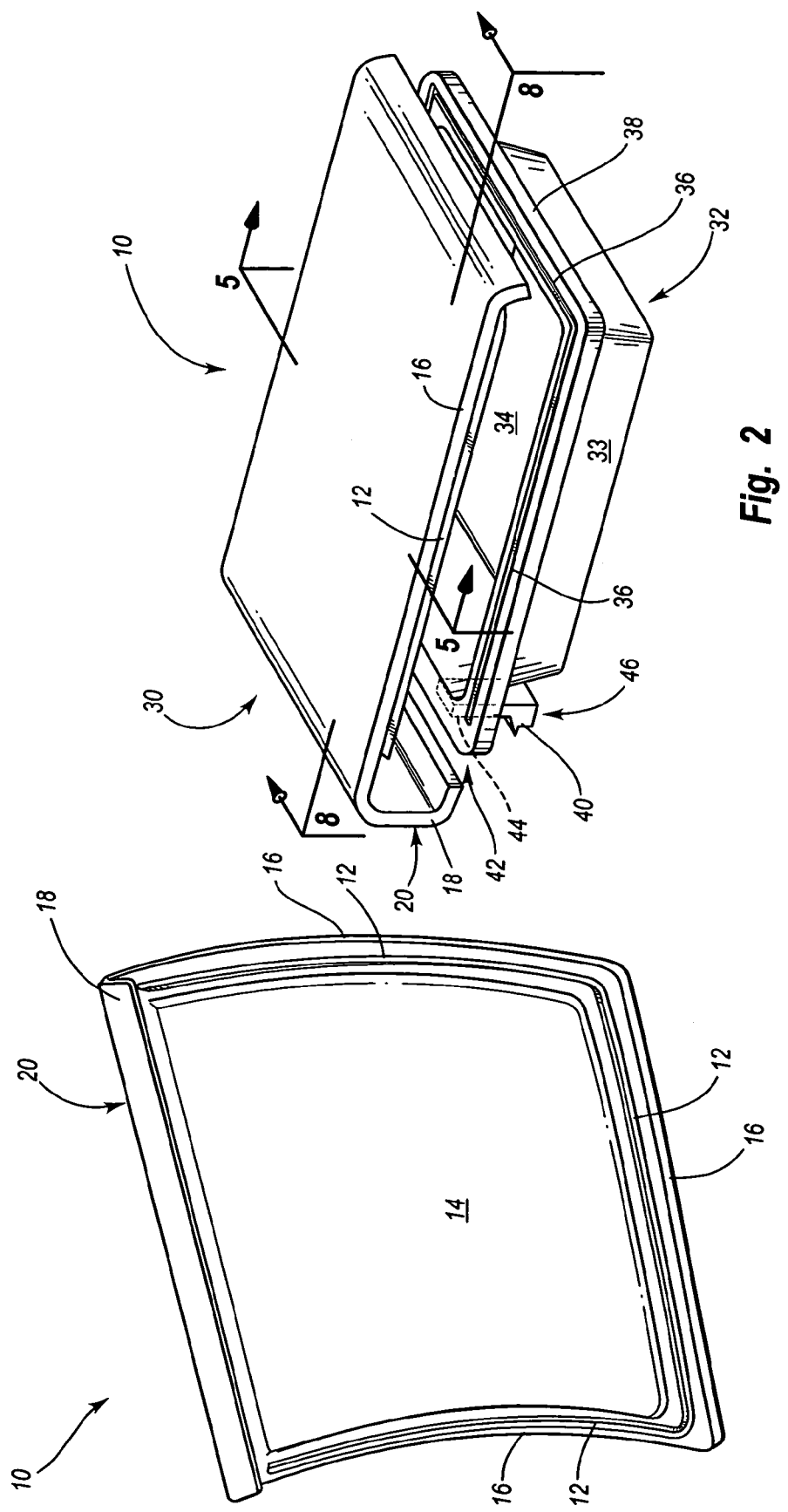
FIG. 1 is a perspective view of an airbag cover.
FIG. 2 is a perspective view of an airbag opening assembly including the airbag cover of FIG. 1.

With reference now to the accompanying figures, particular embodiments of the invention will now be described in greater detail. FIG. 1 depicts a perspective view of an airbag cover 10 that approximates a rectangular shape. As will be discussed further below, the airbag cover 10 may include any number of shapes in accordance with design parameters for airbag sizes and interior space. The cover 10 may be formed of plastic or other suitable material known in the art and is designed to be non-rupturable during airbag deployment. Thus, cover 10 does not include a tear seam and its integrity is maintained.

The airbag cover 10 includes ribs 12 that are disposed on an inner panel 14. The ribs 12 run parallel to the perimeter 16 of the cover 10. The ribs 12 run proximate to the majority of the perimeter 16. As can be appreciated, the exact perimeter length paralleled by the ribs 12 may vary but does not extend along the entire perimeter. The ribs 12 may be disposed in a non-perpendicular orientation relative to the inner panel 14 to improve their ability to engage channels as discussed below. The ribs 12 may form one continuous member or may form a plurality of discrete members. The cover 10 further includes a curved member 18 that is formed on an end 20. The curved member 18 extends sufficiently into a C-shape to receive an end of a tray.

Referring to FIG. 2, a perspective view of a module assembly 30 is shown. The assembly 30 includes the cover 10 of FIG. 1 and a tray 32 to support and partially encapsulate an airbag. The tray 32 may be formed of plastic, aluminum or other suitable material known in the art. The tray 32 includes a housing 33 that defines a cavity 34 to receive an airbag. As can be appreciated by one of skill in the art, the tray 32 may be sized to accommodate airbags of various shapes and sizes from relatively compact airbags to large, expansive airbags.

The tray 32 further includes channels 36 that are disposed proximate and parallel to the perimeter 38 of the tray 32. The channel 36 forms recesses in the tray 32 that may partially or completely extend through the tray 32. The channels 36 are disposed and configured to receive corresponding ribs 12 and retain the ribs in a frictional fit. Accordingly, the channels 36 are configured to extend in the same angular orientation as the ribs 12. Together the ribs 12 and the channels 36 create a rib-channel interface to interlock the cover 10 and the tray 32. As with the ribs 12, the channels 36 do not extend along the entire perimeter 38 of the tray 32. In one embodiment, the interface of the ribs 12 and channels 36 provides most of the engagement between the cover 10 and tray 32. The ribs 12 may extend in proximity along the majority of the cover perimeter 16 and the channels 36 may extend in proximity along the majority of the tray perimeter 38.

The tray 32 includes one or more fasteners 40 that extend from the tray 32. The fasteners 40 couple the tray 32 to a support surface. The support surface is any surface within a vehicle's interior upon which an airbag assembly is mountable. The fasteners 40 may be disposed proximate to an end 42 of the tray 32. The fasteners 40 may be embodied as hooks, prongs, bolts, or the like and are depicted as hooks in FIG. 2 which extend into an aperture of a support surface. A hook 40 includes an extending member 44 and an engaging member 46 that is introduced into an aperture.

In securing the cover 10 to the tray 32, the curved member 18 receives the end 42 and each channel 36 receives a corresponding rib 12 as the cover 10 is pressed or snapped into a closed position. The assembly 30 may then be secured to a support surface by use of the fastener 40.

When the airbag deploys, the cover 10 bulges and disengages the ribs 12 from the channels 36. The curved member 18 bends as the cover 10 opens and may slightly pivot as the airbag expands. The curved member 18 otherwise retains engagement with the tray 32. The force required to open the cover 10 can be varied through the design of the rib/channel interface, location, and quantity or length of ribs 12 and channels 36.

Referring to FIGS. 3 and 4, an alternative embodiment of a cover and opening assembly 60 is shown. The cover 62 includes ribs 64 that are spaced apart from one another and do not form one continuous member. As can be appreciated, the number of discrete ribs 64 may vary as does the length of the spacing between. The channels 66 of tray 68 are also disposed in a spaced apart configuration to form a discrete number. Engagement of the cover 62 to the tray 68 is as discussed in reference to FIGS. 1 and 2 with each channel 66 receiving a corresponding rib 64.

The channels 66 may further be formed to extend completely through the tray 68. In this implementation the channels 66 are referred to as open channels. The open channels 66 are in a spaced apart configuration to support the tray perimeter 70. The tray 68 may be formed of a material, such as aluminum, that is strong enough to support a relatively thin thickness. Upon engagement, the ribs 64 may completely or partially extend through the open channels 66.

Referring to FIG. 5, a cross-sectional view of the cover 10 and tray 32 of FIG. 2 is shown taken along 5-5. The cover 10 includes ribs 12 that extend in a non-perpendicular orientation relative to the cover 10. The tray 32 includes channels 36 that are disposed and configured to receive corresponding ribs 12. The depicted angular orientation of the ribs 12 and channels 36 allows for frictional retention of the ribs 12 within the channels 36. As can be appreciated, the angle of the ribs 12 and channels 36 from a perpendicular position which may vary depending on applied force. Although depicted as angling outward, in an alternative embodiment, the ribs 12 may angle inward and the channels may angle outward.

Referring to FIG. 6, a cross-sectional view of the cover 62 and tray 68 of FIG. 4 is shown taken along 6-6. As depicted, the open channels 66 extend completely through the tray 68. The ribs 64 engage the open channels 66 and may extend nearly or completely through the tray 68 as well.

Figure 7:
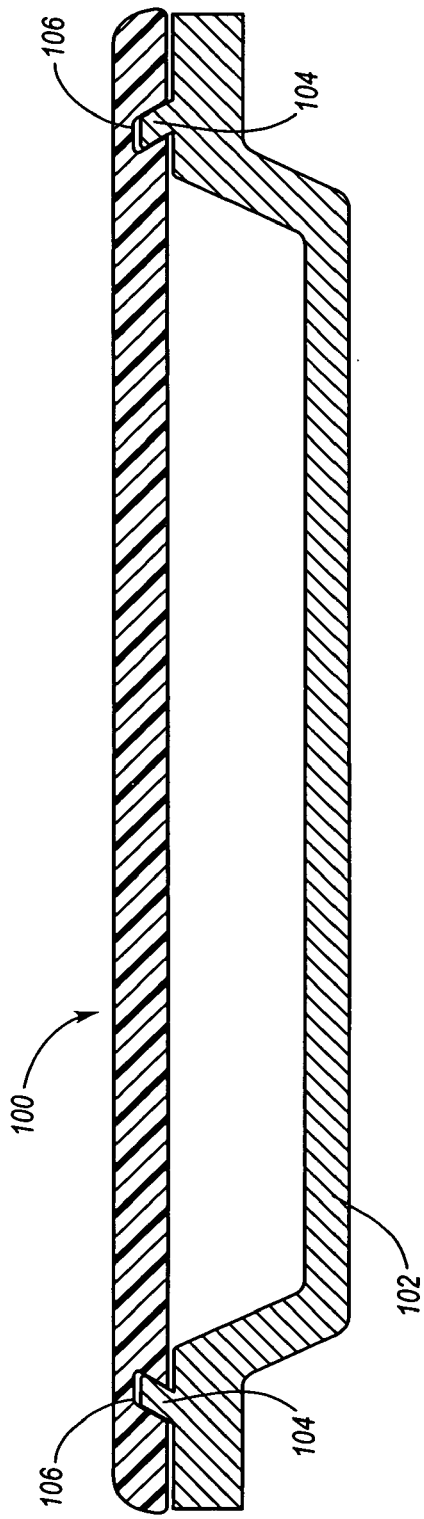
FIG. 7 is a cross-sectional view of an alternative embodiment of an airbag cover and tray.

Referring to FIG. 7, a cross-sectional view of an alternative embodiment of a cover 100 and a tray 102 is shown. The tray 102 includes ribs 104 that extend from the tray 102 in a non-perpendicular orientation relative to the tray 102. The ribs 104 may angle inward, as depicted, or outward. The cover 100 includes channels 106 that are disposed and configured to receive the ribs 104. The channels 106 may also be configured to extend completely through the cover 100. The cover 100 engages the tray 102 in a manner similar to that previously described. During airbag deployment, the cover 100 bulges and the channels 106 dislodge from the ribs 104.

Figure 8:
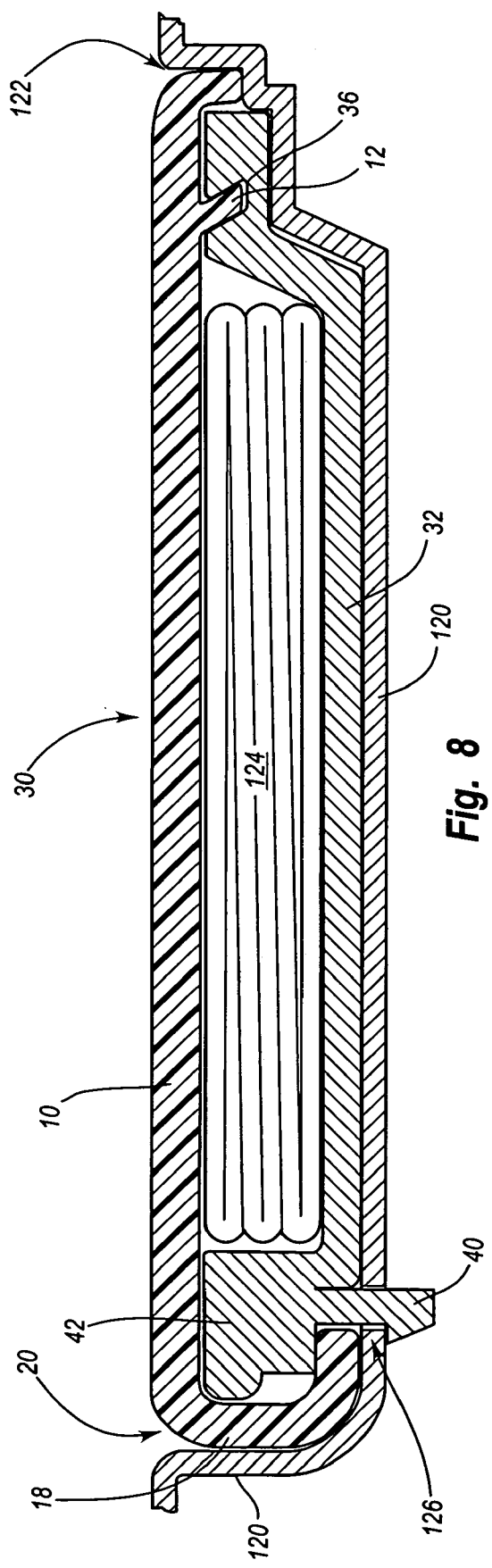
FIG. 8 is a cross-sectional view of the airbag cover and tray of FIG. 2.

Referring to FIG. 8, a cross-sectional view of the assembly 30 of FIG. 2 taken along 8-8 is shown with the assembly 30 coupled to a support surface 120. The support surface 120 may define a recess 122 into which the assembly 30 may nest. An airbag 124 is encapsulated within the cover 10 and the tray 32. The support surface 120 may be an instrument panel, steering wheel surface, or other interior panel. The support surface 120 includes one or more apertures 126 to receive a corresponding fastener 40 from the tray 32.

A fastener 40 extends into the aperture 126 and couples not only the tray 32, but also the entire assembly 30 to the support surface. As can be appreciated, a fastener 40 may be embodied in various forms provided that it is insertable into an aperture 126 and able to retain engagement. The curved member 18 is engaged between the tray 32 and the support surface 120. The cover end 20 is retained during deployment while the ribs 12 dislodge from their corresponding channels 36.

Referring to FIG. 9, a cross-sectional view of an alternative embodiment of an assembly 150 is shown. As in previous embodiments, a cover 152 couples at its end 154 to a tray 156. Instead of a curved member, the cover 152 couples to the tray 156 by a bolt 158 that extends from the cover 152 and through the tray 156. As can be appreciated, the cover 152 may couple to the tray 156 through various techniques known in the art including screws, adhesives, and the like. The cover 152 further couples to the tray 156 by engaging ribs 160 and channels 162 as previously discussed.

Referring to FIGS. 10A-10C, alternative embodiments for covers 200, 202, 204 are shown. As can be appreciated, the size and shape of a cover may vary based on design constraints and still be within the scope of the invention. The depicted covers 200, 202, 204 are therefore shown for illustrative purposes of an infinite variety of design shapes. Although not illustrated, the covers 200, 202, 204 engage trays that may approximate the shape of the covers 200, 202, 204.

Referring to FIG. 10A, although a rectangular cover has been shown in previous embodiments, a cover 200 may be circular with a curved member 206 to engage a tray. The cover 200 further includes ribs 208 to engage corresponding channels in a tray. A circular assembly may be disposed within a steering wheel column.

FIG. 10B illustrates a cover 202 with a more elongated rectangular shape. Such a shape may be used for a side or curtain airbag assembly. As in previous embodiments, the cover 202 includes a curved member 210 and ribs 212 for engaging a tray.

FIG. 10C illustrates a cover 204 with a straight edge 214 and a curvilinear edge 216. The straight-edge portion 214 includes a curved member 218. Ribs 220 are disposed in proximity to the curvilinear edge 216.

Although the covers 200, 202, 204 are depicted with curved members 206, 210, 218, one of skill in the art will appreciate that covers may be secured to trays using alternative techniques as discussed in reference to FIG. 9.

The airbag cover and opening assemblies described herein are securable to a support surface by one or more fasteners extending from a tray. In securing the tray, the cover and an airbag are also secured to the support surface. The assemblies avoid the use of additional brackets and fasteners and their associated cost to assemble and manufacture. By reducing the number of components, the assemblies are more economical to manufacture and easier to assemble.

The covers are non-rupturable which reduces the likelihood of loose parts during deployment. The covers do not have tear seams or the associated poor appearance that may result from a tear seam. The covers provide more material choice as they are not limited to tear seam thickness requirements. Greater flexibility in material choice allows for lower cost and improved quality. Furthermore, less variation in cover thickness allows for less variation in cover opening time over temperature ranges.

It will be obvious to those having skill in the art that many changes may be made to the details of the above-described embodiments without departing from the underlying principles of the invention. The scope of the present invention should, therefore, be determined only by the following claims.

The invention claimed is:

1. An airbag assembly, comprising:
a non-rupturable cover including a rib extending in proximity to a majority of a cover perimeter without extending around the entire perimeter; and
a tray including,
a housing defining a cavity to receive an airbag,
a channel disposed within the housing and shaped to receive the rib, the channel extending in proximity to a majority of a tray perimeter, and
a fastener extending from the housing and insertable in an aperture to thereby couple the assembly to a surface.

2. The airbag assembly of claim 1, wherein the cover further includes a curved member to receive an end of the tray upon coupling the cover to the tray.

3. The airbag assembly of claim 1, wherein the fastener includes an extending member coupled to the housing and an engaging member coupled to the extending member.

4. The airbag assembly of claim 1, wherein the rib extends from the cover non-perpendicular relative to the cover.

5. An airbag assembly, comprising:
a cover including a plurality of ribs extending non-perpendicular relative to the cover and disposed in proximity to a cover perimeter; and
a tray including,
a housing defining a cavity to receive an airbag,
a plurality of channels disposed within the housing and shaped to each receive a corresponding rib, the channels disposed in proximity to a tray perimeter, and
a fastener extending from the housing and insertable in an aperture to thereby couple the assembly to a surface;
wherein the plurality of ribs are configured to dislodge from the plurality of channels during deployment of the airbag.

6. The airbag assembly of claim 5, wherein the cover further includes a curved member to receive an end of the tray upon coupling the cover to the tray.

7. The airbag assembly of claim 5, wherein the fastener includes an extending member coupled to the housing and an engaging member coupled to the extending member.

8. The airbag assembly of claim 5, wherein the channels extend completely through the tray housing.

9. An airbag assembly, comprising:
a non-rupturable cover including a channel extending in proximity to a majority of a cover perimeter without extending around the entire perimeter; and
a tray including,
a housing defining a cavity to receive an airbag,
a rib disposed on the housing and shaped to engage the channel, the rib extending in proximity to a majority of a tray perimeter, and
a fastener extending from the housing and insertable in an aperture to thereby couple the assembly to a surface.

10. The airbag assembly of claim 9, wherein the cover further includes a curved member to receive an end of the tray upon coupling the cover to the tray.

11. The airbag assembly of claim 9, wherein the fastener includes an extending member coupled to the housing and an engaging member coupled to the extending member.

12. The airbag assembly of claim 9, wherein the rib extends from the tray non-perpendicular relative to the cover.

13. An airbag assembly, comprising:
a cover including a plurality of channels disposed in proximity to a cover perimeter; and
a tray including,
a housing defining a cavity to receive an airbag,
a plurality of ribs disposed on the housing and extending non-perpendicular relative to the housing, the ribs shaped to each engage a corresponding channel, the ribs disposed in proximity to a tray perimeter, and
a fastener extending from the housing and insertable in an aperture to thereby couple the assembly to a surface;
wherein the plurality of channels are configured to dislodge from the plurality of ribs during deployment of the airbag.

14. The airbag assembly of claim 13, wherein the cover further includes a curved member to receive an end of the tray upon coupling the cover to the tray.

15. The airbag assembly of claim 13, wherein the fastener includes an extending member coupled to the housing and an engaging member coupled to the extending member.

16. An airbag assembly, comprising:
a cover including an end and a rib extending non-perpendicular from the cover and disposed in proximity to a cover perimeter; and
a tray including,
a housing defining a cavity to receive an airbag and having an end coupled to the cover end,
a channel disposed within the housing and shaped to receive the rib, the channel disposed proximate to a tray perimeter, and
a fastener extending from the housing and insertable in an aperture to thereby couple the assembly to a surface;
wherein the rib is configured to disengage the channel upon deployment of the airbag while the cover end retains engagement with the end of the housing.

17. The airbag assembly of claim 16, wherein the cover end includes a curved member receiving the end of the tray housing to thereby couple the cover to the tray.

18. The airbag assembly of claim 16, wherein the cover includes a bolt extending proximate to the cover end and engaging the end of the tray housing to thereby couple the cover to the tray.

19. The airbag assembly of claim 16, wherein the cover end and the tray end are coupled by adhesive.

20. The airbag assembly of claim 16, wherein the cover includes a plurality of ribs disposed in proximity to the cover perimeter, the ribs extending non-perpendicular to the cover, and wherein the tray includes a plurality of channels disposed in proximity to the tray perimeter and shaped to each receive a corresponding rib.

21. An airbag assembly, comprising:
a cover including an end and a channel disposed in proximity to a cover perimeter; and
a tray including,
a housing defining a cavity to receive an airbag and having an end coupled to the cover end,
a rib disposed on the housing and extending non-perpendicular from the housing, the rib to engage the channel, the rib disposed proximate to a tray perimeter, and a fastener extending from the housing and insertable in an aperture to thereby couple the assembly to a surface;

wherein the channel is configured to disengage the rib upon deployment of the airbag while the cover end retains engagement with the end of the housing.

22. The airbag assembly of claim 21, wherein the cover end includes a curved member receiving the end of the tray housing to thereby couple the cover to the tray.

23. The airbag assembly of claim 21, wherein the cover includes a bolt extending proximate to the cover end and engaging the end of the tray housing to thereby couple the cover to the tray.

24. The airbag assembly of claim 21, wherein the cover end and the tray end are coupled by adhesive.

25. The airbag assembly of claim 21, wherein the cover includes a plurality of channels disposed in proximity to the cover perimeter, and wherein the tray includes a plurality of ribs disposed in proximity to the tray perimeter, the ribs each engaging a corresponding channel.

26. A method for deploying an airbag housed within an airbag assembly having a non-rupturable cover, comprising:

disposing an airbag within a cavity of a tray;

coupling an end of the non-rupturable cover with an end of the tray;

engaging a rib of the cover with a channel of a tray to create a frictional fit between the rib and the channel; and initiating expansion of the airbag to press against the cover and force the dislodgement of the rib from the channel.

27. An airbag assembly, comprising:

a tray to support an airbag and including, a housing defining a cavity to receive an airbag and having an end, and fastening means extending from the housing for coupling the assembly to a surface;

a non-rupturable cover having an end coupled to the end of the tray housing; and interface means disposed on the tray and cover for providing frictional retention of the cover to the tray, such that the interface means is configured to dislodge upon deployment of the airbag.

* * * * *